Nov. 18, 1958     D. R. WHITNEY     2,860,882
WORK CHUCK
Filed Sept. 11, 1957

INVENTOR.
Donald R. Whitney
BY
ATTORNEY

United States Patent Office 2,860,882
Patented Nov. 18, 1958

2,860,882
WORK CHUCK

Donald R. Whitney, Detroit, Mich., assignor to General Motors Corporation, Detroit, Mich., a corporation of Delaware Application September 11, 1957, Serial No. 683,256

6 Claims. (Cl. 279—6)

This invention relates to a work holding chuck device generally and more particularly to means providing for radial and angular adjustment of a work holding jaw member relative to a rotatable spindle.

In machining operations where close tolerances are necessary considerable time is lost and great expense incurred in the time necessary to set up the equipment to insure such limits.

It is here proposed to provide a work holding chuck device for use in a lathe or other machine tool whereby a work holding jaw member may be radially and angularly adjusted relative to the driving spindle of the work tool without undue effort and loss of time and with micrometer accuracy.

It is proposed to make use of screw or other positive deflection means between two members of different stiffness, one of said members connecting the work holding jaw member to the rotatable spindle, for separating such members and whereby the relative deflection of said members is inversely proportional to their stiffness. With such members disposed in parallel relation, and concentric with the axis of rotation of the spindle, a radial adjustment of the work holding jaw member may be effected. By having the members disposed in unparallel relation an angular adjustment of the work holding member relative to the spindle may be obtained.

The proposed work holding chuck device is relatively inexpensive to manufacture and assemble and may make use of coarse screw adjustments to obtain small relative movement with micrometer accuracy.

Referring to the sketch, two beams of different stiffness "A" and "B" are shown secured to a base member "C." A turn screw "D" is threaded through beam "B" and is engaged with beam "A." As the screw "D" is turned to move the two beams apart the deflection of the beams is inversely proportional to their stiffness. Assuming that beam "A" is one thousand times (1000) as stiff as beam "B," the adjustment of the screw "D" to increase the distance between the beams by one thousandth of an inch (.001") will move beam "A" 1 micro-inch (.000001") and beam "B" will move 999 micro-inches (.000999").

The accuracy of the 1 micro-inch motion of beam "A" will be determined by the ability to increase the distance between the beams by the specified one thousandth of an inch and the accuracy of the determination of the stiffness ratio between the beams. Such factors, once determined, may be incorporated with a work holding chuck device to provide extremely accurate radial and angular alignment of a work member as is hereafter described.

Figure 2:
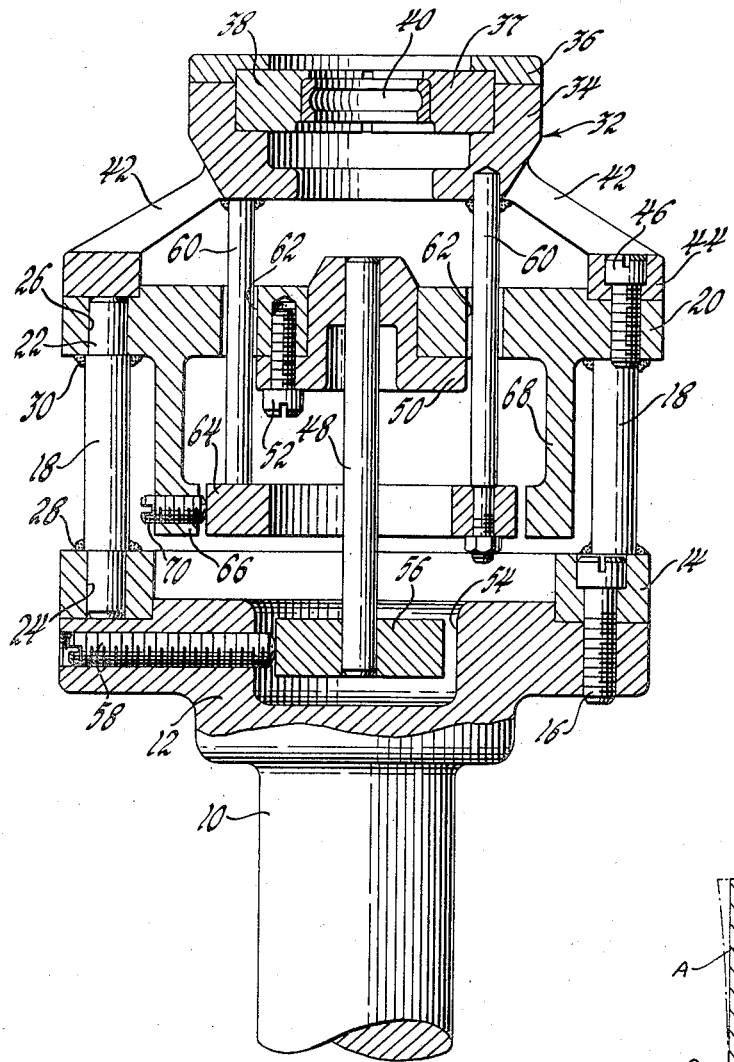
Figure 2 is a cross-sectional view of a work holding chuck device including the principles of this invention.
Figure 1:
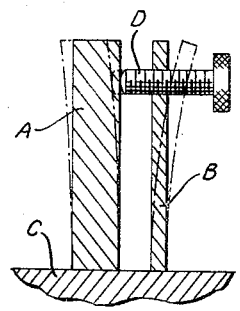
Figure 1 is a sketch of parts arranged to show the principle employed in the proposed work holding chuck device.

Referring to Figure 2, a rotatable spindle member 10 adapted to be driven by suitable means is shown to include a base member 12 having an annular ring 14 secured thereto as by threaded fasteners 16. Posts or beams 18 are secured to the annular ring 14 and support an intermediate flange member 20 in parallel spaced and concentric relation to the spindle member 10. The ends of the posts or beams 18 are undercut as at 22 and received in guide holes 24 and 26 formed in the annular ring and flange member respectively, and are welded thereto as at 28 and 30.

The work holding jaw member 32 is disposed in spaced relation to the flange member 20 and concentric with the flange and spindle members. The jaw member includes jaw parts 34 and 36 engaging and holding centering jaw members 37 and 38 which in turn receive and hold the workpiece 40. Any suitable work holding jaw member may be used other than the one which has been illustrated.

The work holding jaw member 32 includes conically disposed beam members 42 extended outwardly as spider arms or spokes and secured to an annular ring 44 which is in turn secured to the flange 20 as by fasteners 46.

The flange 20 has a rod 48 secured centrally thereto as by the connecting collar 50 and fasteners 52. The rod is concentrically disposed relative to the spindle 10 and depends from the flange to within a recess 54 formed in the base member 12. A collar 56 provided on the end of the rod 48 is engaged by a turn screw 58 threaded through the side wall of the base member 12.

Adjustment of the turn screw 58 will deflect rod 48 relative to the beams 18 an amount inversely proportional to the respective stiffness of the rod and beams and will in turn cause a radial adjustment of the flange 20, and the work holding jaw member 32 secured thereto, relative to the spindle 10.

The work holding jaw member 32 also includes depending rod members 60 received through suitable openings 62 provided in the flange member and having the ends thereof including collars 64 disposed adjacent the end 66 of a sleeve portion 68 formed from the flange member 20. Turn screw means 70 threaded through the depending ends 66 of the sleeve portion of flange 20 are engaged with the collar 64 of the rod 60 and will deflect the rod relative to the spokes or beams 42 an amount inversely proportional to their respective stiffness. Since the beams are not disposed in parallel relation to the rods 60 an angular adjustment of the work holding jaw member 32 is effected relative to the flange 20 and consequently to the spindle 10.

With the proposed work holding chuck device it should be apparent that the adjustment of the turn screws 58 and 70 will effect a radial or angular adjustment of the work holding jaw member 32 for centering the workpiece 40 relative to the rotatable spindle 10.

What is claimed is:

1. A work holding chuck device comprising a rotatable spindle member receivable within a driving member and including means for holding a work member substantially centered relative to the axis of rotation of said spindle, said chuck device including a work holding jaw member spaced apart from said spindle and having separate connecting members of different stiffness secured therebetween, and turn screw means threaded through one of said connecting members and engaged with another thereof of different stiffness for deflecting said connecting members from their normal position an amount inversely proportional to the ratio of stiffness therebetween and for simultaneously effecting an adjustment of said work jaw member relative to the axis of rotation of said spindle.

2. A work holding chuck device comprising a rotatable spindle member having a work holding jaw member spaced apart therefrom and connecting beam members secured therebetween, a rod member connected to said work holding jaw member and disposed in spaced relation to said beam members, said rod and beam members being of different relative stiffness, and turn screw means engaged between said rod and beam members for deflecting each of said rod and beam members from their normal position an amount inversely proportional to the ratio of stiffness therebetween and for effecting an adjustment of said work jaw member connected thereto.

3. The work holding chuck device of claim 2 wherein said rod and beam members are initially in substantially parallel spaced relation for effecting radial adjustment of said work jaw member connected thereto.

4. The work holding chuck device of claim 2 wherein said rod and beam members are disposed in non-parallel spaced relation for effecting angular adjustment of said work jaw member connected thereto.

5. The work holding chuck device of claim 2 having some of said rod and beam members disposed initially in substantially parallel spaced relation and other of said rod and beam members disposed in non-parallel spaced relation, and separate turn screw means between the first and last-mentioned group of rod and beam members for separately adjusting the radial and angular disposition, respectively, of said work jaw member connected thereto.

6. A work holding chuck device including a rotatable spindle having a work holding jaw member disposed in concentric spaced relation thereto, an intermediate flange member disposed between said spindle and said work holding jaw member, peripherally disposed beam members connected between said spindle and said flange and a rod member secured to and depending from said flange member to a position next adjacent said spindle, conically disposed spoke members connected between said flange and said work holding jaw member and rod members secured to and depending from said jaw member to a position next adjacent said flange member, turn screw means engaged between said spindle and said rod and operative for radially adjusting said flange relative to said spindle, and other turn screw means engaged between said flange and said rod members and operative for angularly adjusting said work holding member relative to said flange, said first and second-mentioned turn screw means in combination providing means for the radial and angular adjustment of said work jaw member relative to said spindle.

References Cited in the file of this patent

UNITED STATES PATENTS

| | | |
|---|---|---|
| 1,812,455 | Stowell | June 30, 1931 |
| 2,538,289 | Arms | Jan. 16, 1951 |
| 2,719,721 | Grobey | Oct. 4, 1955 |